(12) United States Patent
Ganbe et al.

(10) Patent No.: US 9,643,285 B2
(45) Date of Patent: May 9, 2017

(54) CREAM SOLDER COMPOSITION

(71) Applicants: FUJI ELECTRIC CO., LTD., Kawasaki-shi (JP); FUJI ELECTRIC FA COMPONENTS & SYSTEMS CO., LTD., Chuo-ku, Tokyo (JP)

(72) Inventors: Tatsuya Ganbe, Asaka (JP); Kenji Okamoto, Hachioji (JP)

(73) Assignees: FUJI ELECTRIC CO., LTD., Kawasaki-shi (JP); FUJI ELECTRIC FA COMPONENTS & SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 14/509,435

(22) Filed: Oct. 8, 2014

(65) Prior Publication Data
US 2015/0020923 A1    Jan. 22, 2015

Related U.S. Application Data

(63) Continuation of application No. PCT/JP2013/066553, filed on Jun. 17, 2013.

(30) Foreign Application Priority Data

Jun. 20, 2012  (JP) ................. 2012-138828

(51) Int. Cl.
*B23K 35/362* (2006.01)
*B23K 35/26* (2006.01)
*B23K 35/36* (2006.01)
*C08G 59/06* (2006.01)
*C08L 63/00* (2006.01)
*C22C 13/00* (2006.01)
*B23K 35/02* (2006.01)

(52) U.S. Cl.
CPC ............ *B23K 35/362* (2013.01); *B23K 35/26* (2013.01); *B23K 35/3613* (2013.01); *B23K 35/3618* (2013.01); *C08G 59/063* (2013.01); *C08L 63/00* (2013.01); *B23K 35/025* (2013.01); *B23K 35/0244* (2013.01); *B23K 35/262* (2013.01); *C22C 13/00* (2013.01)

(58) Field of Classification Search
CPC .......................... B23K 35/362; B23K 35/3613
USPC ............................................ 148/24
See application file for complete search history.

(56) References Cited

U.S. PATENT DOCUMENTS

| 2003/0051770 A1 | 3/2003 | Nishina et al. |
| 2012/0061820 A1 | 3/2012 | Maejima et al. |
| 2012/0156502 A1* | 6/2012 | Maejima .................. C09J 7/00 428/414 |

FOREIGN PATENT DOCUMENTS

| CN | 102473655 A | 5/2012 | |
| JP | 2000-216300 A | 8/2000 | |
| JP | 2002-239785 A | 8/2002 | |
| JP | 2003-103398 A | 4/2003 | |
| JP | 2008-012576 A | 1/2008 | |
| JP | WO 2011033743 A1 * | 3/2011 | ............... C09J 7/00 |
| WO | 2011/033743 A1 | 3/2011 | |

OTHER PUBLICATIONS

International Search Report issued in PCT/JP2013/066553, dated Aug. 6, 2013.
Office Action issued in CN201380019162.3, mailed Oct. 30, 2015. English translation provided.

* cited by examiner

*Primary Examiner* — Weiping Zhu
(74) *Attorney, Agent, or Firm* — Rossi, Kimms & McDowell LLP

(57) ABSTRACT

A soldering flux is disclosed which exhibits improved shape retention properties during printing, can inhibit sagging upon heating, and exhibits high electrical reliability between conductors. The soldering flux contains an epoxy resin, an organic carboxylic acid and, as a heat-resistant shape-retaining agent, and a plastic having a linear structure, wherein the epoxy resin and the organic carboxylic acid are blended so that the quantity of carboxyl groups in the organic carboxylic acid is 0.8 to 2.0 equivalents relative to 1.0 equivalent of epoxy groups in the epoxy resin, and the total quantity of the epoxy resin, the organic carboxylic acid and the plastic having a linear structure is 70 mass % or more relative to the total mass of the flux.

12 Claims, No Drawings

CREAM SOLDER COMPOSITION

BACKGROUND OF THE INVENTION

A. Field of the Invention

The present invention relates to a soldering flux suitable for soldering electronic components and to a composition that contains this soldering flux.

B. Description of the Related Art

Many soldering fluxes are obtained by adding an activator consisting of an organic acid, a halide salt or a halogen compound to a rosin or a rosin-modified resin. However, these soldering fluxes remain as residues on printed circuit boards following completion of a soldering operation, and these residues are often the cause of substrate corrosion, migration, and so on. In addition, in cases where printed circuit boards on which residues remain are sealed with a resin (a silicone gel, epoxy resin, and so on), flux residues remaining following completion of a soldering operation can inhibit curing of the sealing resin, and this can affect adhesion to a substrate and insulating properties. Therefore, cleaning with a freon substitute or an organic solvent is carried out upon completion of a soldering operation in order to remove these residues. However, restrictions on cleaning agents are currently in place due to environmental problems caused by freons and VOCs.

Epoxy resin-containing fluxes are known as a type of flux which do not cause corrosion or migration and which do not inhibit curing of a sealing resin even if flux residues are not removed by cleaning (see Japanese Patent Application Publication No. 2000-216300). In general, epoxy-based fluxes are constituted from an epoxy resin as the main component, an organic acid or amine that is a curing agent or activator, and an alcoholic solvent. In cases where a cream solder that contains an epoxy-based flux is used to mount a component on a printed circuit board, the process is designed so that a curing reaction between the epoxy resin and a carboxylic acid occurs when removing an oxide film on the surface of a semiconductor by means of a carboxylic acid during reflow soldering, and the curing reaction is terminated when the solder melts and the soldering is complete. Following the soldering, a cured product of the epoxy resin remains as a flux residue. Compared to residues of commonly used rosin-based fluxes, this epoxy resin is superior in terms of not impairing adhesion between a printed circuit board and a sealing resin and exhibiting excellent insulating properties when sealing with a resin without cleaning following soldering.

Furthermore, a flux is known whereby even in cases where soldering is carried out using a lead-free solder having a melting point of 190 to 240° C., the activating properties of the flux are maintained, solder wettability is good and curing of a sealing resin is not impaired even if flux residues are not cleaned (see Japanese Patent Application Publication No. 2002-239785).

The present invention is directed to overcoming or at least reducing the effects of one or more of the problems set forth above.

SUMMARY OF THE INVENTION

However, even the above-mentioned epoxy-based flux for a lead-free solder requires further inhibition of solder balls between conductors on a printed circuit board and capillary balls under chip components and requires a significant increase in electrical reliability between conductors.

The inventors of the present invention found that by blending a plastic having a linear structure as a heat-resistant shape-retaining agent in an epoxy-based flux, it was possible to solve problems such as preventing sagging upon preheating and ensuring shape retention properties when printing cream solders, which are thought to produce solder balls and capillary balls, and thereby completed the present invention.

That is, one embodiment of the present invention is a soldering flux which contains an epoxy resin, an organic carboxylic acid and, as a heat-resistant shape-retaining agent, a plastic having a linear structure, wherein the aforementioned epoxy resin and the aforementioned organic carboxylic acid are blended so that the quantity of carboxyl groups in the aforementioned organic carboxylic acid is 0.8 to 2.0 equivalents relative to 1.0 equivalent of epoxy groups in the aforementioned epoxy resin, and the total quantity of the aforementioned epoxy resin, the aforementioned organic carboxylic acid and the aforementioned plastic having a linear structure is 70 mass % or more relative to the total mass of the flux.

It is preferable for the aforementioned plastic having a linear structure to be one or more types of plastic selected from among a polyamide derived from a cyclic amide monomer and polypropylene. In addition, it is preferable for the aforementioned plastic having a linear structure to be a polyamide which is derived from a cyclic amide monomer and which has a number average molecular weight (Mn) of 1000 to 3000 and a polydispersity (Mw/Mn) of 1.10 to 1.30. In addition, it is preferable for the aforementioned plastic having a linear structure to be a polypropylene having a number average molecular weight (Mn) of 5000 to 9000.

It is preferable for the aforementioned plastic having a linear structure to be blended at a quantity of 0.5 to 30 mass % relative to the total mass of the flux.

It is preferable for the flux to further contain an alcohol at a quantity of 30.0 mass % or lower relative to the total mass of the flux.

It is preferable for the aforementioned epoxy resin to be selected from among the group consisting of bisphenol A type epoxy resins, bisphenol F type epoxy resins, novolac type epoxy resins, alicyclic epoxy resins and mixtures thereof.

It is preferable for the aforementioned bisphenol A type epoxy resin to be a bisphenol A type epoxy resin having an epoxy equivalent weight of 160 to 250 g/ep.

It is preferable for the flux to further contain an activator that removes oxides, the activator being selected from among the group consisting of amines, halogenated amines, halogenated organic acid salts, halogen compounds, organic acids, acid anhydrides and mixtures thereof.

Another embodiment of the present invention is a solder composition which contains one of the aforementioned soldering fluxes and a lead-free solder having a melting point of 190 to 240° C.

It is preferable for the aforementioned lead-free solder in the solder composition to be a tin-containing lead-free solder having a melting point of 190 to 240° C.

By soldering using the soldering flux according to the present invention, it is possible to inhibit sagging upon printing and sagging upon heating, which cause solder balls and capillary balls, and also possible to ensure electrical reliability between conductors. In addition, the soldering flux according to the present invention has the advantage of being able to form a film having excellent adhesive properties even when sealing with a resin without cleaning after soldering

DETAILED DESCRIPTION OF SPECIFIC EMBODIMENTS

A first embodiment of the present invention relates to a soldering flux. The soldering flux according to the present embodiment contains an epoxy resin, an organic carboxylic acid and, as a heat-resistant shape-retaining agent, a plastic having a linear structure.

In the flux of the present embodiment, the epoxy resin contained as a main component is a liquid at room temperature, acts as a solvent for the organic carboxylic acid when preparing the flux and, as mentioned above, gives a cured flux product when polymerized with the carboxylic acid, and a cured product of the epoxy resin exhibits excellent insulation properties. Because the epoxy resin and the organic carboxylic acid are consumed in the flux curing reaction, the quantities of epoxy resin and organic carboxylic acid remaining as flux residues are reduced, and the flux can be used without being cleaned. Furthermore, epoxy resin remaining as flux residue binds strongly to the sealing resin (a silicone gel, epoxy resin, or the like), and the cured epoxy resin covers soldered positions and reinforces connections.

The epoxy resin contained in the flux in the above-mentioned embodiment is preferably selected from among bisphenol A type epoxy resins, bisphenol F type epoxy resins, novolac type epoxy resins, alicyclic epoxy resins and mixtures thereof. It is more preferable for the epoxy resin to be selected from among bisphenol A type epoxy resins, bisphenol F type epoxy resins and alicyclic diglycidyl ester type epoxy resins. It is preferable for the above-mentioned bisphenol A type epoxy resin to be a bisphenol A type epoxy resin having an epoxy equivalent weight of approximately 160 to 250 g/ep.

The organic carboxylic acid contained in the flux of the present embodiment acts as an activator used to remove metal oxides and the like, and is also used in the curing reaction with the above-mentioned epoxy resin. The flux according to the present embodiment does not require the use of an activator other than the organic carboxylic acid (an amine, halogen-based activator, acid anhydride, or the like) as an essential constituent, and solder wettability is excellent even if an activator other than the organic carboxylic acid is not used. However, the use of an activator other than the organic carboxylic acid is not precluded in the flux in the present embodiment, as mentioned later. In addition, a cured flux product obtained by sufficiently polymerizing this carboxylic acid and the above-mentioned epoxy resin and then carrying out reflowing exhibits good insulation properties. In addition, because this organic carboxylic acid is consumed either in the above-mentioned curing reaction with the epoxy resin or in a reaction with a sealing resin, the flux can be used without being cleaned.

The above-mentioned organic carboxylic acid contained in the flux of the present invention can be a difunctional or higher organic carboxylic acid, for example a saturated aliphatic dicarboxylic acid, an unsaturated aliphatic dicarboxylic acid, a cyclic aliphatic dicarboxylic acid, an aromatic dicarboxylic acid, an amino group-containing carboxylic acid, a hydroxyl group-containing carboxylic acid, a heterocyclic dicarboxylic acid, or a mixture thereof. More specifically, the above-mentioned organic carboxylic acid can be a saturated aliphatic dicarboxylic acid such as succinic acid, glutaric acid, adipic acid, azelaic acid or dodecanoic acid, an unsaturated aliphatic dicarboxylic acid such as itaconic acid or mesaconic acid, cyclic aliphatic carboxylic acids such as cyclobutane dicarboxylic acid, cyclohexane dicarboxylic acid, cyclohexene dicarboxylic acid or cyclopentene tetracarboxylic acid, a side chain-containing saturated aliphatic dicarboxylic acid such as dimethylglutaric acid or methyladipic acid, an amino group-containing carboxylic acid such as glutamic acid or ethylenediamine tetraacetic acid, a hydroxyl group-containing carboxylic acid such as citric acid, malic acid or tartaric acid, a heterocyclic dicarboxylic acid such as pyrazinedicarboxylic acid, phenylene diacetic acid, catechol diacetic acid, hydroquinone diacetic acid, thiopropionic acid, thiodibutyric acid, dithioglycolic acid, or a mixture of these. In order to improve solder wettability, storage stability and the insulation properties of a cured flux product and to further improve various physical properties of the flux, such as coatability and printability, it is preferable for the organic carboxylic acid to be selected from among the group consisting of cyclohexene dicarboxylic acid, dimethylglutaric acid, glutamic acid, phthalic acid, itaconic acid and mixtures of these.

In the flux of the present embodiment, the epoxy resin and the organic carboxylic acid are blended so that the quantity of carboxyl groups in the organic carboxylic acid is 0.8 to 2.0 equivalents relative to 1.0 equivalent of epoxy groups in the epoxy resin, and the total quantity of the epoxy resin, the organic carboxylic acid and the plastic having a linear structure is 70 mass % or more relative to the total mass of the flux.

The epoxy resin and the organic carboxylic acid undergo a polymerization reaction as the temperature increases, thereby curing the flux, but by using the flux of the present invention, the temperature at the top of an exothermic peak in the flux curing reaction on account of the polymerization of the epoxy resin and the organic carboxylic acid is 180 to 250° C., and preferably 180 to 230° C. In addition, the reaction initiation temperature for the flux curing reaction caused by polymerization of the epoxy resin and the organic carboxylic acid is 180 to 230° C. Therefore, even if a lead-free solder having a high melting point (approximately 190 to 240° C.) is used, it is possible to prevent most of the above-mentioned organic carboxylic acid, which is an activator, from being consumed in the flux curing reaction caused by the polymerization reaction with the epoxy resin before the solder melts. In this way, the activating properties of the carboxylic acid are maintained and good solder wettability can be achieved, meaning that good soldering can be achieved. From the perspective of storage stability, it is preferable for the polymerization reaction to be initiated at a temperature of 130° C. or higher in the flux of the present invention. However, if the temperature at the top of an exothermic peak in the polymerization reaction between the epoxy resin and the organic carboxylic acid is 180 to 250° C., the initiation temperature of the flux curing reaction caused by polymerization of the epoxy resin and the organic carboxylic acid can be lower than 180° C. In addition, the epoxy resin and/or organic carboxylic acid contained in the flux of the present embodiment can be a mixture of a plurality of epoxy resins and/or a mixture of a plurality of organic carboxylic acids, as mentioned later, but in cases where such mixtures are used, the epoxy resins and organic carboxylic acids contained in the mixture(s) should be such that the temperature at the top of an exothermic peak and the reaction initiation temperature in the flux curing reaction caused by the polymerization fall within the above-mentioned ranges, and it is possible to use, as primary components of the mixture(s), epoxy resins and/or organic carboxylic acids in which the temperature at the top of an exothermic peak and the reaction initiation temperature in the flux curing reaction caused by the polymerization fall within the above-mentioned ranges as primary components of the mixture(s). Moreover, the above-mentioned reaction initiation temperature and the temperature at the top of an exothermic peak in the flux curing reaction caused by the polymerization can be measured by differential scanning calorimetry (DSC) and so on.

In the soldering flux in the present embodiment, the epoxy resin and the organic carboxylic acid are blended so that the quantity of carboxyl groups in the organic carboxylic acid is 0.8 to 2.0 equivalents relative to 1.0 equivalent of epoxy groups in the epoxy resin because the activating properties of the carboxylic acid are reduced and solder wettability deteriorates if the quantity of carboxyl groups in the organic carboxylic acid is lower than 0.8 equivalents, and excess solid carboxylic acid causes the fluidity of the flux to deteriorate and the solder wettability therefore deteriorates if the quantity of carboxyl groups in the organic carboxylic acid is higher than 2.0 equivalents. In order to improve solder wettability, storage stability and the insulation properties of a cured flux product, it is preferable for the epoxy resin and the organic carboxylic acid to be blended so that the quantity of carboxyl groups in the organic carboxylic acid is 0.8 to 1.1 equivalents relative to 1.0 equivalent of epoxy groups in the epoxy resin, and more preferable for the epoxy resin and the organic carboxylic acid to be blended so that the quantity of carboxyl groups in the organic carboxylic acid is 1.0 equivalent relative to 1.0 equivalent of epoxy groups in the epoxy resin.

The total quantity of the epoxy resin, the organic carboxylic acid and the plastic having a linear structure is 70 mass % or more relative to the total mass of the flux because if this total quantity is lower than 70 mass %, the activating properties of the carboxylic acid are reduced and solder wettability deteriorates. The total quantity of the epoxy resin, the organic carboxylic acid and the plastic having a linear structure is preferably 80 mass % or more, and more preferably 80 to 90 mass %, relative to the total mass of the flux.

The plastic having a linear structure, which is used as a shape-retaining agent, is an additive that imparts the flux with heat resistance and shape retention properties under conditions of high temperature when a solder alloy is molten. The plastic having a linear structure is a polymer derived from a cyclic amide, and can be a polyamide, and more specifically a polyamide obtained using a lactam-based compound such as ε-caprolactam, γ-lactam or δ-lactam as a monomer, and it is also possible to use a mixture of these monomers. In particular, a polyamide which is derived from the above-mentioned cyclic amides and which has a number average molecular weight (Mn) of 1000 to 3000 and a polydispersity (Mw/Mn) of 1.10 to 1.30 can be advantageously used. It is more preferable for the number average molecular weight (Mn) to be 1000 to 1500 and the polydispersity (Mw/Mn) to be 1.10 to 1.20. However, the number average molecular weight and polydispersity of the polyamide are not limited to these ranges. The plastic having a linear structure may also be polypropylene. In particular, it is possible to use a polypropylene having a number average molecular weight (Mn) of 5000 or higher, for example 5000 to 9000, or a polypropylene having a number average molecular weight (Mn) of 7000 to 8000. It is possible to use a mixture of the above-mentioned polyamide and polypropylene as the plastic having a linear structure that is used as a shape-retaining agent. That is, the plastic having a linear structure may be a single type of plastic or a combination of two or more types of plastic.

The content of the plastic having a linear structure is preferably 0.5 to 30 mass %, and more preferably 2.0 to 20 mass %, relative to the total mass of the flux. If the content of the plastic having a linear structure exceeds 30 mass % relative to the total mass of the flux, the viscosity of a cream solder increases, and printing may become difficult.

The soldering flux of the present invention may also contain an alcohol as an optional component. If the soldering flux contains an alcohol, it is preferable for the content of the alcohol to be 30 mass % or lower relative to the total mass of the flux. If the content of the alcohol exceeds 30 mass % relative to the total mass of the flux, curing of a sealing resin, and particularly curing of a silicone gel, can be inhibited. From perspectives such as improving the insulation properties of a cured flux product in particular, the content of the alcohol is preferably 20 mass % or lower, and more preferably 10 to 20 mass %, relative to the total mass of the flux.

The above-mentioned alcohol component contained in the soldering flux according to the present embodiment is used as a solvent and is a component that dissolves the organic carboxylic acid and lowers the viscosity of the flux. Furthermore, the above-mentioned epoxy resin also reacts with the alcohol, meaning that the alcohol does not remain as a residue. However, even if the alcohol is not contained in the flux according to the present embodiment, this flux can be used as a flux for a lead-free solder.

The alcohol contained in the soldering flux according to the present embodiment can be a mono-alcohol, a polyhydric alcohol or a mixture thereof. Examples of mono-alcohols include methyl alcohol, ethyl alcohol, propyl alcohol, butyl alcohol, isobutyl alcohol, amyl alcohol, isoamyl alcohol, octanol, allyl alcohol, cyclohexanol and mixtures thereof. Examples of polyhydric alcohols include ethylene glycol, di(ethylene glycol), tri(ethylene glycol), propylene glycol, octene glycol, poly(ethylene glycol), glycerin, propane diol and mixtures thereof. A polyhydric alcohol is preferred, and a mixture of a polyhydric alcohol and a mono-alcohol is more preferred. A mixture of a polyhydric alcohol and a mono-alcohol improves the insulation properties of a cured flux product after reflowing. A preferred mixture of a mono-alcohol and a polyhydric alcohol is a mixture of a mono-alcohol selected from among amyl alcohol, octanol and mixtures thereof and a polyhydric alcohol selected from among ethylene glycol, di(ethylene glycol), tri(ethylene glycol), propylene glycol, poly(ethylene glycol), glycerin, propane diol and mixtures thereof.

According to circumstances, an activator which removes oxides and which is selected from among the group consisting of amines, halogenated amines, halogenated organic acid salts, halogen compounds, organic acids, acid anhydrides and mixtures thereof may also be added to the flux. Moreover, because the organic carboxylic acid can function as an activator in the flux of the present embodiment, as mentioned above, there is no need to add an activator other than the above-mentioned organic carboxylic acid as an essential constituent component.

Thixotropy-imparting agents, chelating agents, antifoaming agents, surfactants and antioxidants may also be added to the above-mentioned flux according to need. Preferred contents of these components relative to the total mass of the flux are 5 mass % or lower in the case of a thixotropy-imparting agent, 5 mass % or lower in the case of a chelating agent, 1 mass % or lower in the case of an anti-foaming agent, 2 mass % or lower in the case of a surfactant and 3 mass % or lower in the case of an antioxidant. The thixotropy-imparting agent can be castor oil, stearic acid amide, or the like, but is not limited to these. Other commonly used thixotropy-imparting agents can be used as appropriate.

An explanation will now be given of a method for preparing the soldering flux according to the present embodiment. The method for preparing the soldering flux according to the present embodiment includes a step of mixing an epoxy resin, an organic carboxylic acid and, as a heat-resistant shape-retaining agent, a plastic having a linear structure at a prescribed temperature, and a step of cooling the obtained mixture to room temperature. This prescribed temperature is preferably 150° C. or lower, and more preferably 100 to 130° C.

In cases where the soldering flux further contains an alcohol as an optional component, the preparation method also includes the step in which the organic carboxylic acid is dissolved in the alcohol prior to the above-mentioned mixing step. The temperature at which this dissolution step is carried out is preferably approximately 120 to 130° C., and more preferably 80 to 100° C.

In cases where the soldering flux further contains another activator as an optional component, the activator can be added at the same time as the organic carboxylic acid. In addition, in cases where the soldering flux contains a thixotropy-imparting agent, a chelating agent, an anti-foaming agent, a surfactant, an antioxidant, and the like, these components can be added at the same time as the organic acid.

The soldering flux according to the first embodiment exhibits an excellent solder powder shape-retaining effect and can be effectively used in a solder composition.

A second embodiment of the present invention is a solder composition which contains the flux according to the above-mentioned first embodiment and a lead-free solder.

The lead-free solder used in the present embodiment is preferably a lead-free solder having a melting point of approximately 190 to 240° C., and more preferably a lead-free solder having a melting point of 210 to 230° C. A preferred embodiment is a tin-containing lead-free solder having a melting point of approximately 190 to 240° C. Such tin-containing lead-free solders include tin solders, tin-silver-based solders, tin-copper-based solders, tin-zinc-based solders and tin-antimony-based solders (which have melting points of approximately 190 to 240° C.). Tin-silver-based solders are more preferred. Such tin-silver-based solders include tin-silver, tin-silver-copper, tin-silver-bismuth, tin-silver-copper-bismuth, tin-silver-copper-indium, tin-silver-copper-sulfur and tin-silver-copper-nickel-germanium. A Sn-3.5Ag-0.5Cu-0.1 Ni-0.05Ge solder or Sn-3.5Ag-0.5Cu solder is more preferred.

It is preferable for the lead-free solder to be contained at a quantity of approximately 85 to 95 mass % relative to the total mass of the solder composition. The remaining approximately 5 to 15 mass % can be the flux.

The solder composition can be prepared by mixing the soldering flux according to the first embodiment with a particulate lead-free solder at room temperature. The solder composition may be in a form such as a cream or paste.

An explanation will now be given of a method for using the solder composition according to the second embodiment of the present invention. The soldering flux according to the first embodiment can be used without being cleaned in an electronic component reflow soldering process that uses a lead-free solder. For example, in an electronic component reflow soldering process, a flux curing reaction, which is caused by polymerization of the epoxy resin and organic carboxylic acid contained in the flux of the present invention, starts and the organic carboxylic acid, which is the activator, cleans the solder bonding surface before the lead-free solder melts. The flux of the present invention is such that the temperature at which the flux curing reaction caused by polymerization starts is approximately 180 to 230° C. or such that the temperature at the top of an exothermic peak in the flux curing reaction is approximately 180 to 250° C., and preferably approximately 180 to 230° C., even if the reaction initiation temperature is approximately 180° C. or lower, meaning that it is possible to prevent much of the organic carboxylic acid from being consumed in the curing reaction before the lead-free solder (which has a melting point of approximately 190 to 240° C.) melts, meaning that the activation properties of the organic carboxylic acid are maintained and solder wettability is improved. Next, the lead-free solder melts as the heating temperature is increased, and soldering is effected between an electronic component and a conductor pattern on a printed circuit board. The flux curing reaction progresses during this period also, the reaction is terminated at around the point when the soldering is complete or terminated by heating (curing the sealing resin or the like) either at around the point when the soldering is complete or after the soldering, and the cured epoxy resin covers a soldered position and reinforces a connection.

Next, without cleaning the printed circuit board, by sealing the circumference of the printed circuit board by means of an epoxy resin or urethane resin having functional groups able to react with components in the flux of the present invention, residual carboxylic acid contained in the flux residue reacts with the sealing resin, almost all of the carboxylic acid is consumed in this curing reaction, thereby reducing the corrosive properties of the flux, and the epoxy resin that is the main component of the epoxy-based flux and the sealing resin bind strongly to each other. In addition, when sealing with a silicone gel (and especially with an addition reaction type silicone gel), if the flux is a conventional rosin-based flux, the silicone gel inhibits curing, but when using the flux of the present invention, the silicone gel does not inhibit curing even if flux residues are not cleaned. Therefore, even in the case of a lead-free solder having a higher melting point than a lead-based solder, using the epoxy-based flux of the present invention improves solder wettability, improves the insulation reliability even when flux residues are not cleaned after soldering and does not inhibit curing of the sealing resin.

EXAMPLES

The present invention will now be explained in greater detail through the use of examples. The present invention is not limited to the following examples.

In each of the following examples and comparative examples, a flux was prepared, a solder composition containing the prepared flux and a lead-free solder was prepared, and the solder composition was evaluated in terms of sagging upon printing, sagging upon heating and solder balls.

(1) Preparation of Flux 28.5 g of cis-4-cyclohexene-1,2-dicarboxylic acid was added to 16.7 g of tri(ethylene glycol), and melted by being heated to approximately 130° C. The mixture was then cooled to 100° C. or lower, 52.8 g of the epoxy resin AER260 (bisphenol A type epoxy resin, epoxy equivalent weight 192 g/eq, manufactured by Asahi Kasei Corporation) and 2.0 g of a cyclic amide-derived polyamide (VA-800, manufactured by KYOEISHA CHEMICAL Co., LTD., Mn=1330, Mw/Mn=1.18), which is a plastic having a linear structure that acts as a heat-resistant shape-retaining agent, were added to the mixture and stirred until homogeneous, thereby obtaining the flux of Example 1. The epoxy resin and carboxylic acid contained in the flux were blended so that the quantity of carboxyl groups was 1 equivalent relative to 1 equivalent of epoxy groups. In addition, the total content of the epoxy resin, the carboxylic acid and the plastic having a linear structure used as a heat-resistant shape-retaining agent was approximately 83 mass % relative to the total mass of the flux, and the content of alcohol was approximately 17 mass % relative to the total mass of the flux.

The flux of Example 2 was prepared in the same way as in Example 1, except that the plastic having a linear structure that was used as a heat-resistant shape-retaining agent was changed to a polypropylene (CERAF LOUR™-914, manufactured by BYK Japan KK, number average molecular weight (Mn)=7500). In addition, a flux to which a plastic having a linear structure was not added was prepared as the flux of Comparative Example 1.

(2) Preparation of solder composition

A cream solder composition was prepared by cooling the above-mentioned flux to room temperature, and then adding and mixing the above-mentioned flux with a solder powder, which had a particle diameter of 20 to 40 μm and contained a lead-free solder consisting of a Sn-3.5Ag-0.5Cu-0.1Ni-0.05Ge alloy (containing 95.85 mass % of Sn, 3.5 mass % of Ag, 0.5 mass % of Cu, 0.1 mass % of Ni and 0.05 mass % of Ge, and having a melting point of 223° C.).

(3) Evaluation of Solder

Sagging upon heating was evaluated by screen printing the cream solder composition in vertical lines in tandem at prescribed intervals on a ceramic plate in accordance with the "Sagging upon heating test described in Appendix 8 of JIS Z 3284," heating the obtained printed plate for 60 seconds on a hot plate at 150° C., and evaluating changes in the shape of the cream solder composition by visually confirming the smallest gap between adjacent lines, which are not in contact with each other. Sagging upon printing was evaluated in the same way, using the cream solder composition prior to heating.

Solder balls were evaluated in accordance with the "solder ball test in Appendix 11 of JIS Z 3284" by screen printing the cream solder composition on a ceramic plate, heating the obtained printed plate for 60 seconds at 150° C. and then for 30 seconds at 260° C. on a hot plate, and then counting the number of solder balls remaining due to the solder alloy not completely agglomerating.

The blending ratios in the fluxes and the evaluation results for the solders of the examples and comparative examples are shown in Table 1 below.

TABLE 1

| Component | Product | Example 1 | Example 2 | Comparative Example 1 |
| --- | --- | --- | --- | --- |
| Epoxy resin | AER260 | 52.8 | 52.8 | 52.8 |
| Solvent | Tri(ethylene glycol) | 16.7 | 16.7 | 18.7 |
| Organic acid | cis-4-cyclohene-1,2-dicarboxylic acid | 28.5 | 28.5 | 28.5 |
| | VA800 | 2.0 | — | — |
| | PP | — | 2.0 | — |
| Sagging upon printing | | 0.2 | 0.2 | 0.3 |
| Sagging upon heating | | 0.5 | 0.5 | 0.8 |
| Solder balls | | Level 3 | Level 3 | Level 4 |

Thus, a solder flux and solder composition have been described according to the present invention. Many modifications and variations may be made to the techniques and structures described and illustrated herein without departing from the spirit and scope of the invention. Accordingly, it should be understood that the fluxes and compositions described herein are illustrative only and are not limiting upon the scope of the invention.

What is claimed is:

1. A cream solder composition comprising a flux that includes an epoxy resin, an organic carboxylic acid and a plastic having a linear structure as a heat-resistant shape-retaining agent; and a particulate lead free solder, wherein the epoxy resin and the organic carboxylic acid are blended so that the quantity of carboxyl groups in the organic carboxylic acid is 0.8 to 2.0 equivalents relative to 1.0 equivalent of epoxy groups in the epoxy resin, and the total quantity of the epoxy resin, the organic carboxylic acid and the plastic having a linear structure is 70 mass % or more relative to the total mass of the flux.

2. The cream solder composition according to claim 1, wherein the plastic having a linear structure is one or more types of plastic selected from among a polyamide derived from a cyclic amide monomer and polypropylene.

3. The cream solder composition according to claim 1, wherein the plastic having a linear structure is blended at a quantity of 0.5 to 30 mass % relative to the total mass of the flux.

4. The cream solder composition according to claim 1, further containing an alcohol at a quantity of 30 mass % or lower relative to the total mass of the flux.

5. The cream solder composition according to claim 1, wherein the epoxy resin is selected from among the group consisting of bisphenol A type epoxy resins, bisphenol F type epoxy resins, novolac type epoxy resins, alicyclic epoxy resins and mixtures thereof.

6. The cream solder composition according to claim 1, wherein the bisphenol A type epoxy resin is a bisphenol A type epoxy resin having an epoxy equivalent weight of 160 to 250 g/eq.

7. The cream solder composition according to claim 1, further containing an activator that removes oxides, the activator being selected from among the group consisting of amines, halogenated amines, halogenated organic acid salts, halogen compounds, organic acids, acid anhydrides and mixtures thereof.

8. A cream solder composition according to claim 1 wherein the particulate lead-free solder has a melting point of 190 to 240° C.

9. The cream solder composition according to claim 8, wherein the particulate lead-free solder has a particle diameter of 20 to 40 μm.

10. The cream solder composition according to claim 1, wherein the particulate lead-free solder is a tin-containing lead-free solder having a melting point of 190 to 240° C.

11. The cream solder composition according to claim 1, additionally comprising an alcohol in an amount of 10 to 20 mass % relative to total mass of the flux.

12. The cream solder composition according to claim 1, wherein the particulate lead-free solder has a particle diameter of 20 to 40 μm.

* * * * *